United States Patent Office 2,861,112
Patented Nov. 18, 1958

2,861,112

FRACTIONAL CRYSTALLIZATION

Edward R. Christensen, Beacon, and Howard V. Hess, Glenham, N. Y., assignors to The Texas Company, New York, N. Y., a corporation of Delaware Application August 31, 1954, Serial No. 453,228

15 Claims. (Cl. 260—674)

This invention relates to a method of fractionating liquid mixtures. More particularly, this invention relates to an improved method of fractional crystallization. This invention is particularly applicable to the separation by fractional crystallization of liquid mixtures of organic compounds, particularly eutectic-forming mixtures of organic compounds. In a very limited aspect this invention is concerned with the separation of a mixture of isomeric, eutectic-forming organic hydrocarbons, such as a liquid mixture containing meta-xylene and para-xylene.

In the co-pending, co-assigned patent application Serial No. 437,790, filed June 18, 1954, now U. S. Patent 2,816,938, in the name of Howard V. Hess, one of the co-inventors of the subject invention, there is disclosed an improved method of fractional crystallization wherein a fractional crystallization operation is carried out under a substantially elevated pressure, such as a pressure in the range 2,000–100,000 p. s. i. g. and higher. It is disclosed in the above-identified patent application that by carrying out a fractional crystallization operation under a substantially elevated pressure, crystallization of a desired component from the mixture undergoing fractional crystallization can be achieved at an elevated temperature, substantially higher than the crystallization temperatures conventionally employed and wherein the liquid mixture undergoing crystallization is not subjected to an elevated pressure. The process disclosed in the above-identified patent application is particularly applicable to fractional crystallization of liquid mixtures containing meta-xylene and para-xylene for the recovery of para-xylene therefrom. When the above-described process is employed for the fractionation of such mixtures, crystallization of para-xylene can be effected at substantially room temperature with the result that the cooling and refrigeration requirements of conventional prior art processes for the recovery of para-xylene by fractional crystallization are substantially avoided and eliminated. It is also disclosed in the above-identified patent application that mixtures containing meta-xylene and para-xylene when subjected to fractional crystallization form a solid eutectic mixture having a composition of about 86% meta-xylene and 14% para-xylene (melting point of about —53° C.) and that when fractional crystallization of such liquid mixtures is carried out at an elevated pressure the composition of the eutectic, i. e. meta-xylene and para-xylene eutectic, is displaced in the direction of that component (meta-xylene) whose freezing point is least effected by the resulting applied pressure. In the practice of our invention we employ the above-described phenomenon to provide an improved fractional crystallization operation.

It is an object of our invention to provide an improved fractional crystallization operation.

It is another object of our invention to provide an improved fractional crystallization operation wherein a substantially complete recovery of each of the components of the mixture undergoing fractionation is possible without the formation of a eutectic.

Another object of our invention is to provide an improved fractional crystallization operation for the recovery of para-xylene from liquid mixtures containing the same.

Still another object of our invention is to provide a method for fractional crystallization of a liquid mixture consisting essentially of meta-xylene and para-xylene whereby substantially complete recovery of the meta-xylene and para-xylene content thereof as separate products is possible.

In at least one embodiment of our invention at least one of the foregoing objects will be achieved.

These and other objects of our invention and how they are accomplished will become apparent in the light of the accompanying disclosure and drawings wherein.

Figure 3:
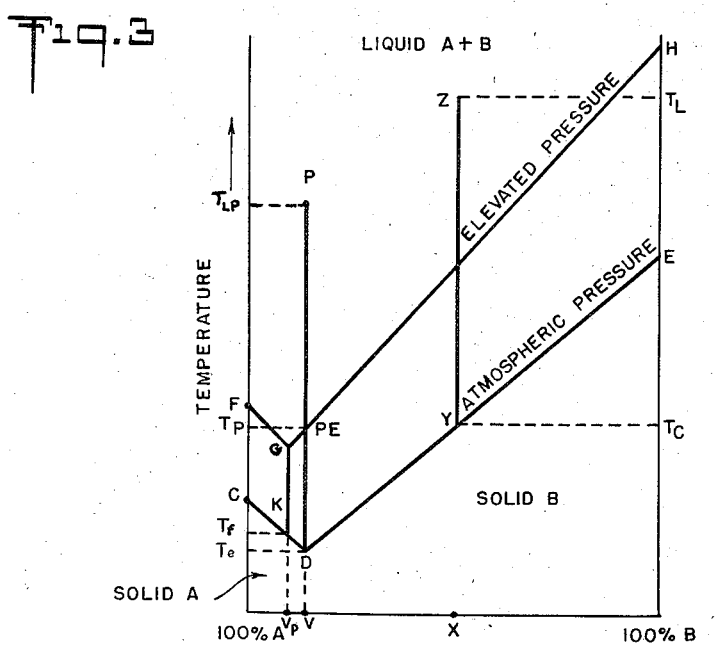

Fig. 3 graphically illustrates the practice of our invention; and

Figure 4:
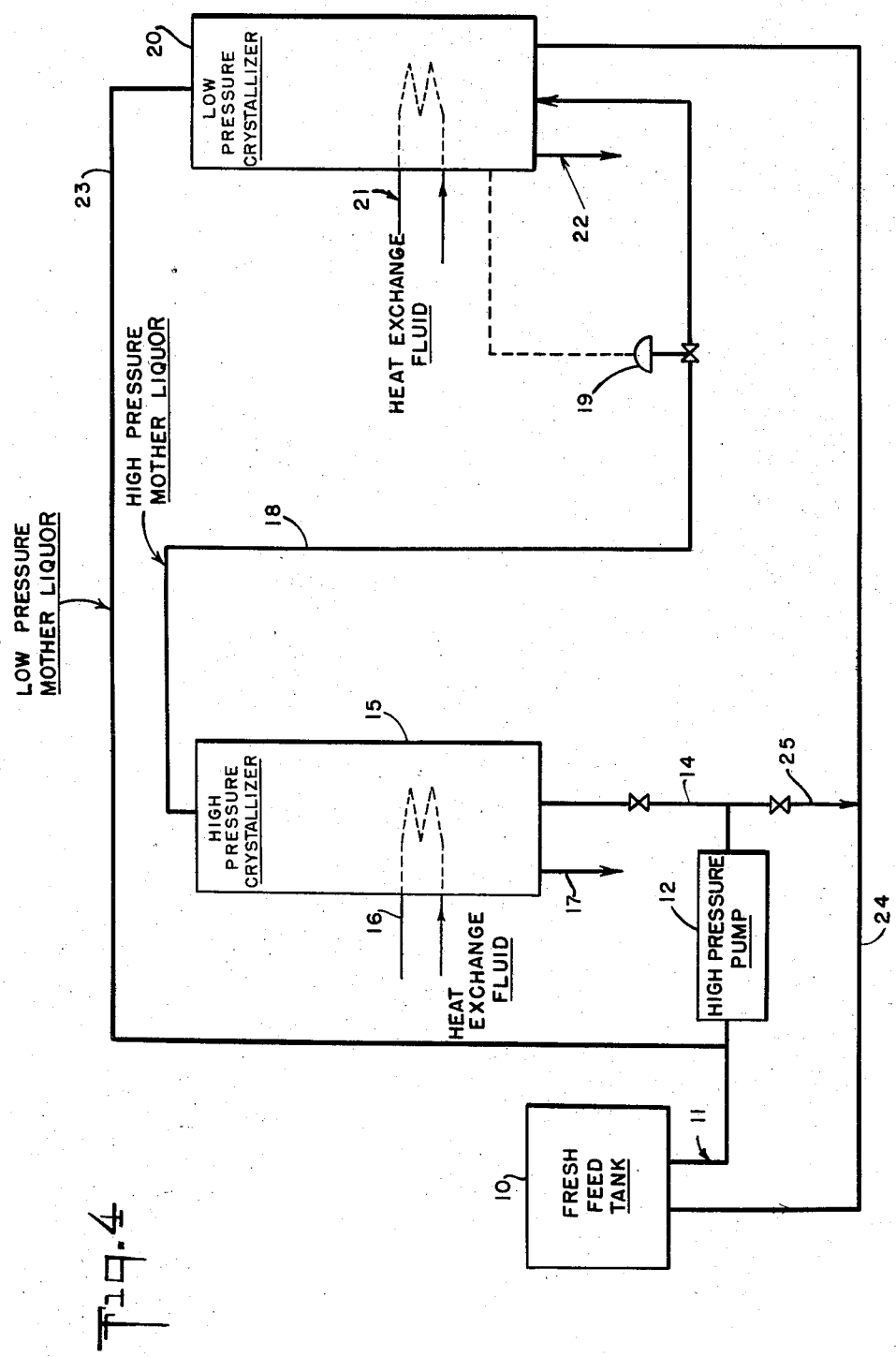

Fig. 4 schematically illustrates the practice of our invention as applied to a liquid hydrocarbon mixture containing meta-xylene and para-xylene.

In accordance with the practice of our invention we provide an improved method of fractional crystallization whereby increased yields of a desired crystallized component or components are possible, which comprises subjecting a liquid mixture to fractional crystallization under one set of conditions of temperature and pressure to crystallize therefrom one of said components and subjecting the resulting mother liquor to a second set of conditions of temperature and pressure, different from said first set of conditions, to crystallize therefrom additional crystalline material. Desirably the aforesaid conditions of temperature and pressure in the aforesaid fractional crystallization operations are adjusted so that there is a pressure differential of at least 2,000 p. s. i. g. between the fractional crystallization operations.

More particularly, in accordance with the practice of our invention a liquid mixture of components which crystallize to form a solid eutectic, the composition and melting (freezing) point of which varies with the pressure applied to said liquid mixture during crystallization, is subjected to fractional crystallization under a first set of conditions of temperature and pressure so as to crystallize therefrom one of said components, and said crystallization operation is continued until the composition of the resulting first mother liquor is substantially the same as the composition of the eutectic mixture derivable or crystallizable therefrom under said first crystallization condition of pressure. The resulting crystallized material is removed and the resulting mother liquor subjected to a second set of conditions of temperature and pressure, different from said first set of conditions, to effect crystallization therefrom of additional crystallized material. The second crystallization is continued until the composition of the resulting second mother liquor is substantially the same as the composition of the eutectic derivable or crystallizable therefrom under said second crystallization condition of pressure.

Figure 1:
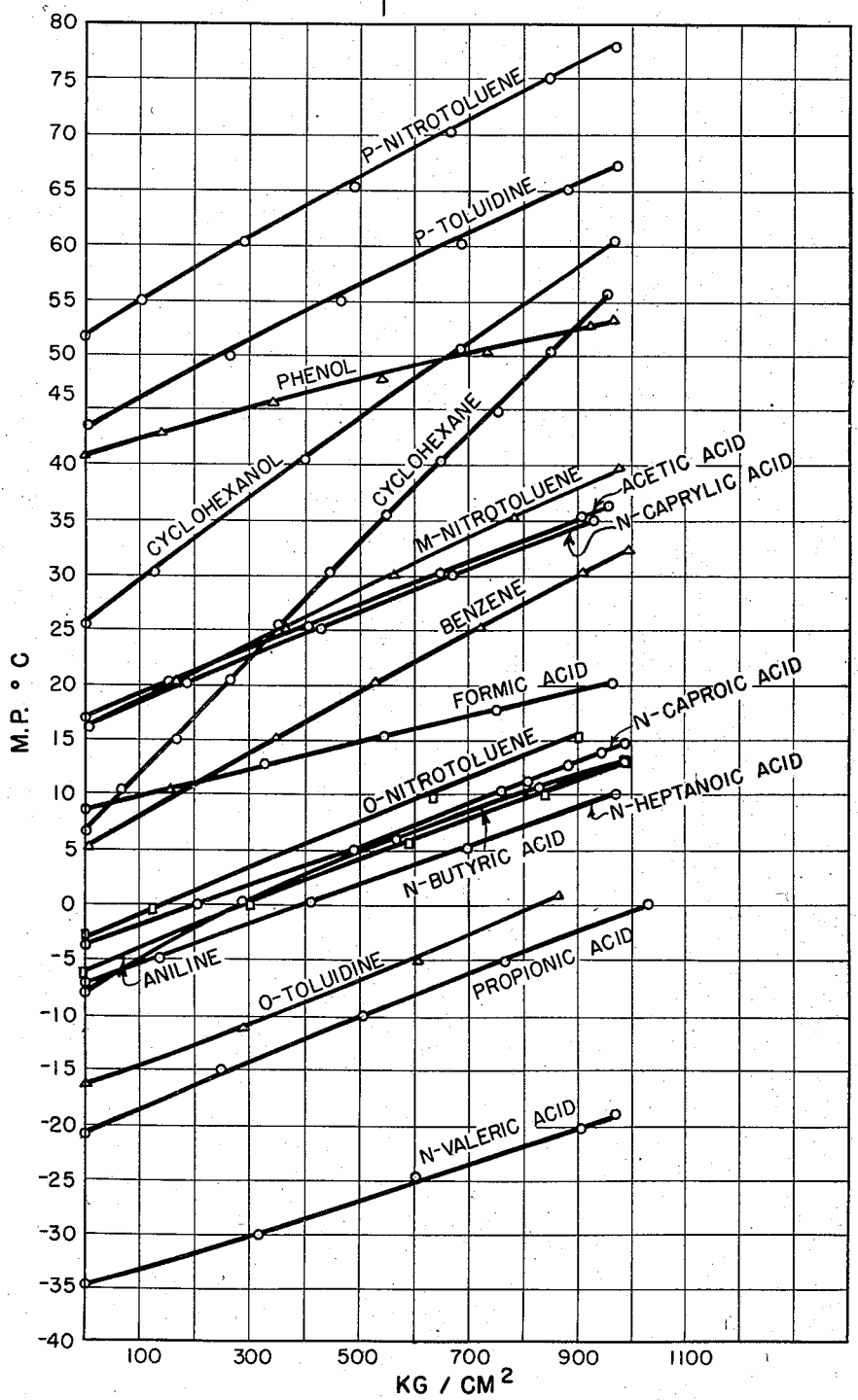
Fig. 1 is a graphical illustration of the influence of pressure on the melting points of various organic compounds.
Figure 2:
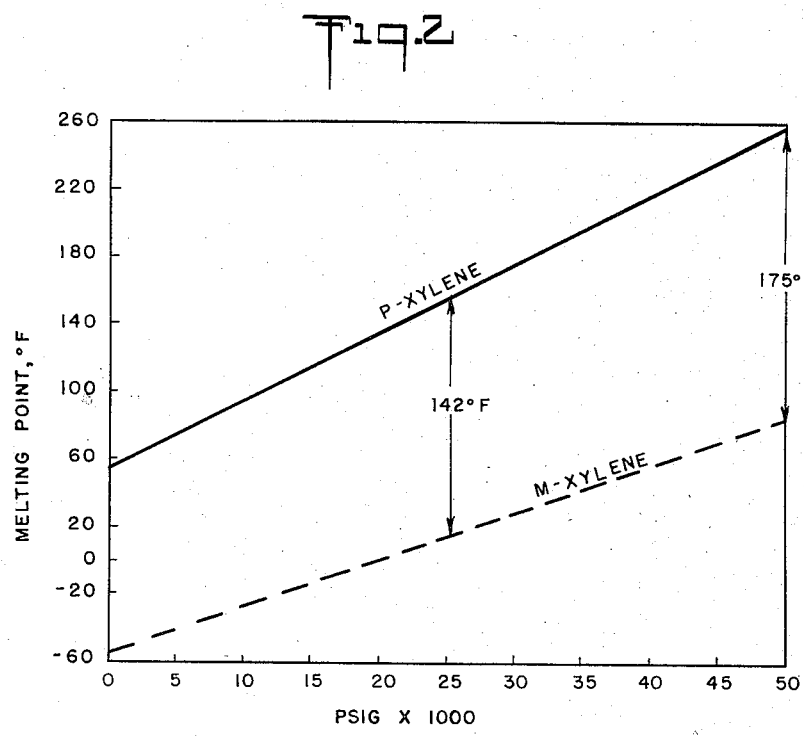
Fig. 2 is a graphical illustration of the effect of pressure upon the melting points of meta-xylene and para-xylene.

Referring now to the drawings, Fig. 1 graphically illustrates the influence of pressure upon the melting points of various compounds which may be separated from mixtures containing the same by the process of this invention. Fig. 2 graphically illustrates the effect of pressure upon the melting points of para-xylene and meta-xylene. As illustrated, at 25,000 p. s. i. g. the melting point of para-xylene is about 155° F. and the melting point of meta-xylene is about 13° F. and at 50,000 p. s. i. g. the melting point of para-xylene is about 260° F. and the melting point of meta-xylene is about 83° F.

Referring now to Fig. 3 of the drawing there is graphically illustrated in connection with a liquid-solid phase diagram of our invention as applied to the fractionation by fractional crystallization of a liquid mixture containing components A and B. Components A and B may be characterized as organic compounds which are capable of forming a solid eutectic having a minimum melting point, as illustrated. Compound A is further characterized as evidencing a smaller increase in freezing point with respect to compound B under increased pressure, i. e. compound A exhibits a smaller $$\frac{\Delta_t}{\Delta_p}$$

than compound B wherein $\Delta_t$ represents change in melting point in °C. and $\Delta_p$ represents change in applied pressure in lbs. per sq. inch gage. Meta-xylene is representative of compound A and para-xylene is representative of compound B. There is illustrated in Fig. 3 the freezing points of mixtures of A and B at atmospheric pressure, line CDE, and the freezing points of mixtures of A and B at an elevated pressure such as 50,000 p. s. i. g., see line FGH.

Referring now in greater detail to Fig. 3 of the drawing, a liquid mixture of compounds A and B having a composition X, e. g. a 50–50% by weight mixture of A and B, is gradually reduced in temperature to effect crystallization of component B therefrom, as illustrated in Fig. 3. When the temperature of the mixture reaches a value $T_c$, as represented by point Y on line ZY, i. e. the juncture of lines ZY and DE wherein line ZY represents the cooling of the liquid mixture and line DE represents the freezing point of mixtures of A and B. At the temperature $T_c$ represented by point Y solid component B is first precipitated from the liquid mixture and as a result the mother liquor becomes more rich in component A, the composition of the mother liquor moving along line DE from point Y in the direction of point D as the temperature of the mother liquor is gradually reduced and as more component B is thereby crystallized from the mother liquor. Point D represents the minimum melting point eutectic of compounds A and B having a melting point represented by $T_e$ and a composition represented by V. Just prior to reaching a mother liquor composition represented by V, so as to avoid crystallization of the illustrated AB eutectic, i. e. about 86% A and 14% B, as graphically illustrated, the resulting precipitated or crystallized compound B is removed from the mother liquor and the mother liquor, now having a composition of about V, is heated to an elevated temperature $T_{LP}$ and then is subjected to an elevated pressure, such as a pressure in the range 2,000–100,000 p. s. i. g. or higher, e. g. 50,000 p. s. i. g. as illustrated and represented by point P on the diagram. The heated pressured mother liquor is then gradually cooled to a temperature $T_p$ at which temperature additional solid component B begins to precipitate from the mother liquor, as indicated at point PE. As the mother liquor is gradually reduced in temperature additional component B crystallizes therefrom so that the composition of the mother liquor gradually approaches the composition represented by point G, i. e. $V_p$, which is the eutectic composition of compounds A and B under the applied pressure, i. e. under a pressure of 50,000 p. s. i. g. When the mother liquor reaches a composition of about $V_p$ the additional crystallized component B is removed therefrom and the pressure on the remaining mother liquor reduced to atmospheric pressure. Thereupon the mother liquor, as represented by point G, is gradually cooled to a temperature $T_f$ (represented by point K) at which temperature component A, as illustrated, crystallizes therefrom. As component A crystallizes from the mother liquor originally at a composition $V_p$, as represented by points G or K which lie along the same straight line, the proportion of component B in the remaining mother liquor gradually increases with the result that the composition of the mother liquor moves along the line segment KD in the direction of point D. Just before the mother liquor reaches the composition represented by point D the resulting separated component A is removed and the mother liquor again subjected to an elevated pressure as indicated hereinabove, care being taken to increase the temperature of the mother liquor prior to subjecting the same to the elevated pressure in order to prevent premature precipitation or crystallization of the mixture or one of the components. The resulting repressured mother liquor at about the composition represented by point P is gradually reduced in temperature to a value of about $T_p$ of which temperature additional component B is crystallized therefrom. Accordingly, in the above-indicated manner and after a sufficient number of the above-described operations a substantially complete fractionation or separation of components A and B from a liquid mixture containing the same can be accomplished and at the same time avoiding the formation and crystallization of a solid AB eutectic mixture.

The practice of our invention is broadly applicable to the separation of liquid mixtures of organic compounds which form a minimum melting point eutectic when subjected to fractional crystallization, one of the components present in the resulting formed eutectic having a smaller increase in melting point upon an increase in applied pressure than another component present in said eutectic composition. The practice of our invention is particularly suitable in the separation of liquid mixtures of organic compounds, such as aromatic and/or alicyclic and/or aliphatic organic compounds, particularly mixtures of normally liquid organic compounds, e. g. compounds which are liquid at atmospheric pressure and at a temperature in the range 25–250° F. Liquid mixtures which may be applied to the fractional crystallization operation in accordance with the practice of our invention are: liquid mixtures of alkyl-substituted aromatic hydrocarbons such as mixtures containing the various xylenes, e. g. the ortho-, meta-, and para-xylenes and ethylbenzene; liquid mixtures containing various $C_9H_{12}$ aromatic hydrocarbons such as hemimellitene, pseudocumene, 1-methyl-2-ethylbenzene, 1-methyl-3-ethylbenzene, 1-methyl-4-ethylbenzene, isocumene, cumene; in general, mixtures of alkyl-substituted aromatic hydrocarbons containing 8–12 carbon atoms per molecule; liquid mixtures of the various isomeric hydroxy-substituted benzene derivatives such as ortho-, meta-, and para-cresols; the xylenols such as 2,4-xylenol, 2,5-xylenol, 3,5-xylenol, 2,3-xylenol, 3,4-xylenol, 2,6-xylenol; liquid mixtures of the various isomeric xylidines such as 2,3-dimethylaniline, 3,4-dimethylaniline, 3,5-dimethylaniline, 2,6-dimethylaniline, 2,4-dimethylaniline, 2,5-dimethylaniline; liquid mixtures of the lutidines and the piccolines and other isomeric alkyl-substituted pyridines; liquid mixtures containing isomeric alkyl-substituted and beta-substituted naphthalenes such as alpha-methyl naphthalene and beta-methyl naphthalene; liquid mixtures containing various isomeric and/or close boiling alkanes, alkenes and alkynes, such as cyclohexane; n-hexane, methylcyclopentane, 2,4-dimethylpentane, 2,2-dimethylpentane, as well as mixtures of the isomeric heptanes, octanes, nonanes, decanes, etc.; liquid mixtures of benzene and cyclohexane and/or other similarly close boiling hydrocarbons; liquid mixtures of aromatic compounds such as the nuclear-substituted halogen, nitro- and amino-derivatives of benzene, toluene, naphthalene and the like; particularly liquid mixtures of the ortho-, meta-, and para-toluidines, the meta- and para-xylidines, and the isomeric alkyl-substituted derivatives of quinoline and naphthol; liquid mixtures containing the various aromatic acids such as the various isomeric phthalic acids and the various toluic acids; liquid mixtures of cycloaliphatic compounds, e. g. liquid mixtures containing cyclohexanone and the various alkyl-substituted derivatives of cyclohexanone; liquid mixtures containing cycloaliphatic alcohols and cycloaliphatic ketones such as cyclohexanol and cyclohexanone; liquid mixtures containing isomeric relatively high molecular weight, saturated, monounsaturated and polyunsaturated carboxylic acids, including the polycarboxylic acids and the hydroxy-substituted acids.

Further the practice of our invention is particularly applicable to the fractionation of a mixture of cyclohexane and benzene for the substantially complete recovery of cyclohexane and benzene therefrom as separate products. Cyclohexane and benzene mixtures at atmospheric pressure (about 14.7 p. s. i. a.) form at −44° C. a solid eutectic containing 24% benzene and 76% (by wt.) cyclohexane. However, cyclohexane has a much larger $$\frac{\Delta_t}{\Delta_p}$$

than benzene (see Fig. 1), therefore upon application of pressure to cyclohexane-benzene mixtures the composition of the eutectic is shifted to increased benzene concentration. Accordingly, suppose it is desired to separate a benzene-cyclohexane mixture containing 90% cyclohexane. Pressure would be applied to the system and pure cyclohexane would be crystallized until the liquid composition reached that of the eutectic (increased benzene content over the eutectic composition at atmospheric pressure). The mother liquor is separated and contains less than 76% cyclohexane (depending on the pressure applied and resulting shift in eutectic composition). The separated mother liquor is then crystallized at a lower pressure, preferably atmospheric pressure (substantially 0 p. s. i. g.), employing refrigeration, to separate solid benzene until the composition of the resulting mother liquor has increased to 76% cyclohexane. The above cycle is then repeated for the substantially complete recovery of the cyclohexane and benzene content of the original mixture.

The practice of this invention is not limited to the above-enumerated mixtures which have been mentioned merely by way of example. In general, the practice of this invention is applicable for the separation of mixtures of components by fractional crystallization wherein said mixtures contain components A and B which form a solid eutectic composition and wherein the melting point of one of said components A or B is less affected, that is undergoes a smaller increase in melting point, than the other of said components when subjected to increased pressure.

Referring now to Fig. 4 of the drawing, there is schematically illustrated the application of the practice of this invention to the fractional crystalization of a para-xylene containing petroleum fraction such as a petroleum fraction having a composition in the range:

| Component: | Volume percent |
|---|---|
| Ortho-xylene | 0–30 |
| Meta-xylene | 5–70 |
| Ethylbenzene | 0–20 |
| Para-xylene | 10–40 |
| Saturated hydrocarbons | 0–30 | e. g. a petroleum fraction containing 60% by volume meta-xylene and 40% by volume para-xylene. A fresh feed mixture containing meta- and para-xylene in a proportion 60–40 by volume respectively is introduced from supply tank 10 via conduit 11 to the intake of high pressure pump 12 where it is pressured to a suitable high pressure such as about 50,000 p. s. i. g. and introduced at that pressure via valved conduit 14 into high pressure crystallizer 15 which is equipped with a suitable heat exchanger 16 for controlling the crystallization temperature within crystallizer 15. As the high pressure fresh feed is introduced into the high pressure crystallizer 15, crystallization takes place with the resulting separation of para-xylene which is removed by suitable means via line 17. The resulting high pressure mother liquor now having a reduced para-xylene content is recovered from crystallizer 15 via conduit 18. As the mother liquor flows along conduit 18 its pressure is reduced upon passing through pressure reducing valve 19 to about atmospheric pressure, i. e. a lower pressure at least sufficient to effect flow of the mother liquor into and through low pressure crystallizer 20. As the mother liquor flows into low pressure crystallizer 20 the temperature of the mother liquor is reduced therein by means of heat exchanger 21 to a suitable value so as to precipitate therefrom additional para-xylene or meta-xylene depending upon the composition of the mother liquor (see Fig. 3) which is dependent upon the extent or amount of para-xylene originally crystallized therefrom in crystallizer 15. Since it is usually desirable to operate the equipment at its maximum capacity and to avoid handling an unusually large amount of material, high pressure crystallizer 15 is operated under conditions such that the mother liquor issuing therefrom and moving along conduit 18 is as rich as possible in meta-xylene content and has a meta-xylene content approaching that of the meta-xylene-para-xylene eutectic at the operating pressure of crystallizer 15 but in any event greater than that of the meta-xylene-para-xylene eutectic which exists at atmospheric pressure, i. e. the meta-xylene content of the mother liquor issuing from crystallizer 15 is greater than 86%, or in other words the para-xylene content of the mother liquor issuing from crystallizer 15 is less than 14%.

Accordingly, when the mother liquor issuing from crystallizer 15 has a para-xylene content less than about 14% there is crystallized within low pressure crystallizer 20 meta-xylene which is recovered by suitable means via line 22. Low pressure crystallizer 20 is operated under conditions such that the mother liquor issuing therefrom via conduit 23 has a composition approaching 86% meta-xylene and 14% para-xylene, care being taken during the operation of low pressure crystallizer 20 to make certain that no meta-xylene-para-xylene eutectic is precipitated therein. The mother liquor in conduit 23 is then advantageously recycled through conduit 11 to the intake of high pressure pump 12 where it is again pressured and subjected to fractional crystallization within crystallizer 15 for the recovery of additional para-xylene therefrom. The above-enumerated steps can be carried out, as indicated in Fig. 3, so that substantially all the meta- and para-xylene content in the original feed mixture is separated as separate products via lines 22 and 17, respectively.

If desired the fresh feed from supply tank 10 may be directly introduced into low pressure crystallizer 20 via conduit 24, fractional crystallization taking place within crystallizer 20 for the recovery of para-xylene and the resulting motor liquor pressured by high pressure pump 12 and passed via conduit 14 into high pressure crystallizer 15 for fractional crystallization therein for the recovery of additional para-xylene. High pressure crytallizer 15 and low pressure crystallizer 20 may be operated at any suitable pressures, for example high pressure crystallizer 15 can be operated in the pressure range 2,000–200,000 p. s. i. g. and low pressure crystallizer operated at a pressure in the range 0–2,000 p. s. i. g. or higher. As indicated, valved conduit 25 may be used to increase the operating pressure of low pressure crystallizer 20 by injecting thereinto high pressure fluid from pump 12 via valved conduit 25 and conduit 24.

As will be apparent to those skilled in the art upon reading the foregoing disclosure many modifications, improvements and alterations are possible without departing from the spirit or scope of this invention.

We claim:

1. A method of fractionally crystallizing a liquid mixture of components which form a eutectic mixture the composition and melting point of which varies with the pressure applied to said liquid mixture during crystallization, which comprises subjecting said liquid mixture to fractional crystallization under first conditions of temperature and a pressure in the range 0–100,000 p. s. i. g. to crystallize therefrom one of said components, continuing said crystallization operation until the composition of the resulting first mother liquor is substantially the same as the composition of the first eutectic mixture crystallizable therefrom under said first crystallization condition of pressure, removing the resulting crystallized material, subjecting the resulting mother liquor to second conditions of temperature and a pressure in the range 0–100,000 p. s. i. g. different from said first conditions the pressure differential between the above-indicated first pressure and second pressure being at least 2,000 p. s. i. g., to effect crystallization therefrom of additional crystallized material and continuing this second crystallization operation until the composition of the resulting second mother liquor is substantially the same as the second eutectic composition crystallizable therefrom under said second crystallization conditions of pressure.

2. A method in accordance with claim 1 wherein said first conditions of temperature and pressure are greater, respectively, than said second conditions of temperature and pressure.

3. A method in accordance with claim 1 wherein said second conditions of temperature and pressure are greater, respectively, than said first conditions of temperature and pressure.

4. A method in accordance with claim 1 wherein said mixture is a liquid mixture consisting essentially of meta-xylene and para-xylene.

5. A method in accordance with claim 1 wherein said liquid mixture has the following composition:

| Component: | Volume percent |
| --- | --- |
| Ortho-xylene | 0–30 |
| Meta-xylene | 5–70 |
| Ethylbenzene | 0–20 |
| Para-xylene | 10–40 |
| Saturated hydrocarbons | 0–30 |

6. A method in accordance with claim 1 wherein said liquid mixture is a liquid mixture of alkyl-substituted pyridine compounds having substantially the same boiling point.

7. A method in accordance with claim 1 wherein said liquid mixture is a liquid mixture of amino-substituted benzene compounds having substantially the same boiling point.

8. A method in accordance with claim 1 wherein said liquid mixture is a liquid mixture of nitro-substituted benzene derivatives having substantially the same boiling point.

9. A method in accordance with claim 1 wherein said liquid mixture consists essentially of cyclohexane and benzene.

10. A method of fractionally crystallizing a liquid mixture of aromatic hydrocarbons containing meta-xylene and para-xylene to form a eutectic mixture the melting point of which varies with pressure applied to said mixture during crystallization, said liquid mixture having a composition such that para-xylene is first crystallized therefrom when said liquid mixture is subjected to fractional crystallization, which comprises subjecting said liquid mixture to fractional crystallization at a reduced temperature and at substantially atmospheric pressure to crystallize para-xylene therefrom, continuing said crystallization operation until the composition of the resulting mother liquor is substantially the same as the composition of the eutectic mixture crystallizable therefrom at substantially atmospheric pressure, removing the resulting crystallized para-xylene, subjecting the resulting mother liquor to an elevated pressure in the range 2,000–100,000 p. s. i. g. and at a relatively elevated temperature to crystallize therefrom additional para-xylene and continuing this second crystallization until composition of the resulting second mother liquor is substantially the same as that eutectic mixture crystallizable therefrom under said second crystallization condition of elevated pressure.

11. A method of fractionally crystallizing a liquid mixture containing meta- and para-xylene initially having a composition in the range such that only para-xylene is crystallized therefrom as a first crystallized product, which comprises subjecting said liquid mixture to fractional crystallization under first conditions of temperature and pressure in the range 2,000–100,000 p. s. i. g. to crystallize only para-xylene, continuing said crystallization operation until the composition of the resulting first mother liquor is substantially the same as the composition of the first eutectic mixture crystallizable therefrom under aforesaid crystallization condition of temperature and pressure, removing the resulting crystallized para-xylene, subjecting the resulting mother liquor to second crystallizing conditions of temperature and at substantially atmospheric pressure to effect crystallization therefrom of meta-xylene, and continuing this second crystallization until the composition of the resulting second mother liquor is substantially the same as that of the second eutectic mixture crystallizable therefrom under said second crystallization conditions.

12. A method of fractionally crystallizing a liquid mixture containing meta- and para-xylene and having a composition in the range such that para-xylene crystallizes therefrom as a first crystalline product which comprises subjecting said liquid mixture to fractional crystallization under first conditions of temperature and pressure in the range 2,000–100,000 p. s. i. g. to crystallize therefrom para-xylene, continuing said crystallization operation until the composition of the resulting first mother liquor is substantially the same as the composition of the first eutectic mixture crystallizable therefrom under said crystallization conditions of temperature and pressure, removing the resulting crystallized para-xylene, subjecting the resulting mother liquor to second conditions of temperature and substantially atmospheric pressure to effect crystallization therefrom of meta-xylene, continuing this second crystallization until the composition of the resulting second mother liquor is substantially the same as that of the second eutectic composition crystallizable therefrom under said second crystallization conditions, removing the resulting crystallized meta-xylene and subjecting resulting second mother liquor to substantially the same said first conditions of pressure and temperature to crystallize additional para-xylene therefrom.

13. A method in accordance with claim 12 wherein said second mother liquor is subjected to said first conditions of temperature and pressure to crystallize additional para-xylene therefrom until the composition of the resulting mother liquor is substantially the same as the composition of the eutectic mixture crystallizable therefrom under said first crystallization conditions of pressure.

14. A method of fractionally crystallizing a liquid mixture containing meta- and para-xylene for the separation of para-xylene therefrom wherein said liquid mixture is subjected to a reduced temperature sufficient to crystallize para-xylene therefrom, said crystallization being carried out until substantially no more pure para-xylene is crystallizable from the resulting mother liquor the improvement which comprises subjecting said mother liquor after the aforesaid crystallization to an elevated pressure in the range 2,000–100,000 p. s. i. g. and subjecting the resulting pressurized mother liquor to fractional crystallization to crystallize therefrom additional pure para-xylene.

15. A method of fractionally crystallizing a liquid mixture consisting essentially of meta- and para-xylene and having a composition in the range such that when said liquid mixture is subjected to a reduced temperature and substantially atmospheric pressure only meta-xylene is crystallizable therefrom which comprises subjecting said liquid mixture to fractional crystallization at a suitable temperature and a pressure in the range 2,000–100,000 p. s. i. g. to crystallize therefrom substantially pure meta-xylene, continuing the aforesaid crystallization operation until the composition of the resulting mother liquor approaches and is substantially the same as the composition of the first eutectic derivable from said mother liquor under the aforesaid crystallization conditions, removing the resulting crystallized meta-xylene, subjecting the resulting mother liquor to a reduced temperature and atmospheric pressure to crystallize therefrom additional meta-xylene, continuing this crystallization operation until the composition of the mother liquor approaches and is substantially the same as the eutectic composition derivable therefrom under said conditions of reduced temperature and atmospheric pressure, removing the additionally crystallized meta-xylene, subjecting the recovered mother liquor to an elevated pressure in the range 2,000–100,000 p. s. i. g. and at a suitable temperature to crystallize therefrom para-xylene and continuing this last crystallization operation until the composition of the resulting mother liquor approaches and has substantially the same composition as the eutectic derivable therefrom under said last conditions of elevated pressure.

References Cited in the file of this patent

UNITED STATES PATENTS

| | | |
|---|---|---|
| 2,402,158 | Glowacki et al. | June 18, 1946 |
| 2,435,792 | McArdle et al. | Feb. 10, 1948 |
| 2,511,711 | Hetzner et al. | June 13, 1950 |
| 2,603,667 | Pankratz et al. | July 15, 1952 |
| 2,622,115 | Carney | Dec. 16, 1952 |
| 2,764,878 | Hachmuth | Oct. 2, 1956 |